United States Patent
Siddaraju

(10) Patent No.: US 12,292,820 B2
(45) Date of Patent: May 6, 2025

(54) GRAPHICAL USER INTERFACE AND LOG ANALYSIS TOOL FOR ANALYZING LOG DATA TO IDENTIFY ERRORS ASSOCIATED WITH APPLICATION EXECUTION

(71) Applicant: Truist Bank, Charlotte, NC (US)

(72) Inventor: Manoj Siddaraju, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 49 days.

(21) Appl. No.: 17/990,249

(22) Filed: Nov. 18, 2022

(65) Prior Publication Data

US 2024/0168872 A1 May 23, 2024

(51) Int. Cl.
*G06F 11/36* (2006.01)
*G06F 11/362* (2025.01)
*G06F 11/3668* (2025.01)

(52) U.S. Cl.
CPC ...... *G06F 11/3692* (2013.01); *G06F 11/3656* (2013.01); *G06F 11/3664* (2013.01)

(58) Field of Classification Search
CPC .... G06N 20/00; G06N 5/022; G06F 11/3476; G06F 11/3692; G06F 11/3656; G06F 11/3664
See application file for complete search history.

(56) References Cited

U.S. PATENT DOCUMENTS

| | | | | |
|---|---|---|---|---|
| 9,798,607 | B1 * | 10/2017 | Kulkarni | G06F 11/079 |
| 10,496,658 | B2 * | 12/2019 | Smith | G06F 16/248 |
| 11,010,235 | B1 * | 5/2021 | Agarwal | G06F 11/0709 |
| 2012/0151278 | A1 * | 6/2012 | Tsantilis | G06F 11/079 714/48 |
| 2015/0169288 | A1 * | 6/2015 | Yamamoto | G06F 16/25 707/752 |
| 2018/0210808 | A1 * | 7/2018 | Shanmugam | G06F 11/366 |
| 2019/0108112 | A1 * | 4/2019 | Kannan | G06F 11/3476 |
| 2021/0124576 | A1 * | 4/2021 | Gungabeesoon | G06F 8/38 |
| 2021/0311918 | A1 * | 10/2021 | Cheng | G06F 11/3636 |
| 2023/0325207 | A1 * | 10/2023 | Muthukrishnan | G06F 11/3476 719/331 |
| 2023/0385267 | A1 * | 11/2023 | Russell | G06F 11/323 |

* cited by examiner

*Primary Examiner* — S. Sough
*Assistant Examiner* — Cheneca Smith
(74) *Attorney, Agent, or Firm* — Kilpatrick Townsend & Stockton LLP; Michael A. Springs, Esq.

(57) ABSTRACT

A system can be provided that can generate a network connection with a computing environment. The computing environment can include development environments that can execute software applications. The system can generate a graphical user interface for display on a display device and detect a selection of a graphical submit element within the graphical user interface by a user. In response to detecting the selection of the graphical submit element, the system can obtain log data from the computing environment. The system can update a first graphical frame to display the log data in its raw format as received from the computing environment and can update a second graphical frame to display a modified version of the log data that highlights operational errors associated with a software application executing in a development environment. The operational errors can be identified by the system analyzing the log data.

20 Claims, 6 Drawing Sheets

GRAPHICAL USER INTERFACE AND LOG ANALYSIS TOOL FOR ANALYZING LOG DATA TO IDENTIFY ERRORS ASSOCIATED WITH APPLICATION EXECUTION

TECHNICAL FIELD

The present disclosure relates generally to log data for software applications and, more particularly (although not necessarily exclusively), to a graphical user interface and log analysis tool for analyzing log data to identify errors associated with application execution.

BACKGROUND

Distributed computing environments such as cloud computing systems can include services and tools for building or executing software applications. Log data can be generated as a byproduct of executing the software applications in the distributed computing environments and can be a record of events that occur during the execution of the software applications. In some examples, log data can be used for debugging problems with the execution of the software applications.

SUMMARY

One example of the present disclosure includes a non-transitory computer-readable medium comprising program code that is executable by a processor for causing the processor to: generate a network connection with a computing environment that includes a plurality of development environments executing a plurality of applications; generate a graphical user interface for display on a display device, the graphical user interface including: a first graphical option for allowing a user to select a particular development environment from among the plurality of development environments; a second graphical option for allowing the user to select a particular application from among the plurality of applications; a graphical submit element that is selectable by the user for retrieving log data associated with execution of the particular application in the particular development environment; a first graphical frame; and a second graphical frame that is distinct from the first graphical frame, wherein the graphical user interface is configured to allow the user to toggle between displaying the first graphical frame and the second graphical frame; detect a selection of the graphical submit element by the user; in response to detecting the selection of the graphical submit element: obtain the log data from the computing environment via the network connection; and update the first graphical frame to display the log data in its raw format as received from the computing environment; and update the second graphical frame to display a modified version of the log data that highlights one or more operational errors associated with the particular application in the particular development environment, the one or more operational errors being identified by analyzing the log data.

Another example of the present disclosure includes a method involving generating a network connection with a computing environment that includes a plurality of development environments executing a plurality of applications; generating a graphical user interface for display on a display device, the graphical user interface including: a first graphical option for allowing a user to select a particular development environment from among the plurality of development environments; a second graphical option for allowing the user to select a particular application from among the plurality of applications; a graphical submit element that is selectable by the user for retrieving log data associated with execution of the particular application in the particular development environment; a first graphical frame; and a second graphical frame that is distinct from the first graphical frame, wherein the graphical user interface is configured to allow the user to toggle between displaying the first graphical frame and the second graphical frame; detecting a selection of the graphical submit element by the user; in response to detecting the selection of the graphical submit element: obtaining the log data from the computing environment via the network connection; and updating the first graphical frame to display the log data in its raw format as received from the computing environment; and updating the second graphical frame to display a modified version of the log data that highlights one or more operational errors associated with the particular application in the particular development environment, the one or more operational errors being identified by analyzing the log data.

Yet another example of the present disclosure includes a system comprising one or more processors and one or more memories, the one or more memories including instructions that are executable by the one or more processors for causing the one or more processors to: generate a network connection with a computing environment that includes a plurality of development environments executing a plurality of applications; generate a graphical user interface for display on a display device, the graphical user interface including: a first graphical option for allowing a user to select a particular development environment from among the plurality of development environments; a second graphical option for allowing the user to select a particular application from among the plurality of applications; a graphical submit element that is selectable by the user for retrieving log data associated with execution of the particular application in the particular development environment; a first graphical frame; and a second graphical frame that is distinct from the first graphical frame, wherein the graphical user interface is configured to allow the user to toggle between displaying the first graphical frame and the second graphical frame; detect a selection of the graphical submit element by the user; in response to detecting the selection of the graphical submit element: obtain the log data from the computing environment via the network connection; and update the first graphical frame to display the log data in its raw format as received from the computing environment; and update the second graphical frame to display a modified version of the log data that highlights one or more operational errors associated with the particular application in the particular development environment, the one or more operational errors being identified by analyzing the log data.

DETAILED DESCRIPTION

Figure 1:
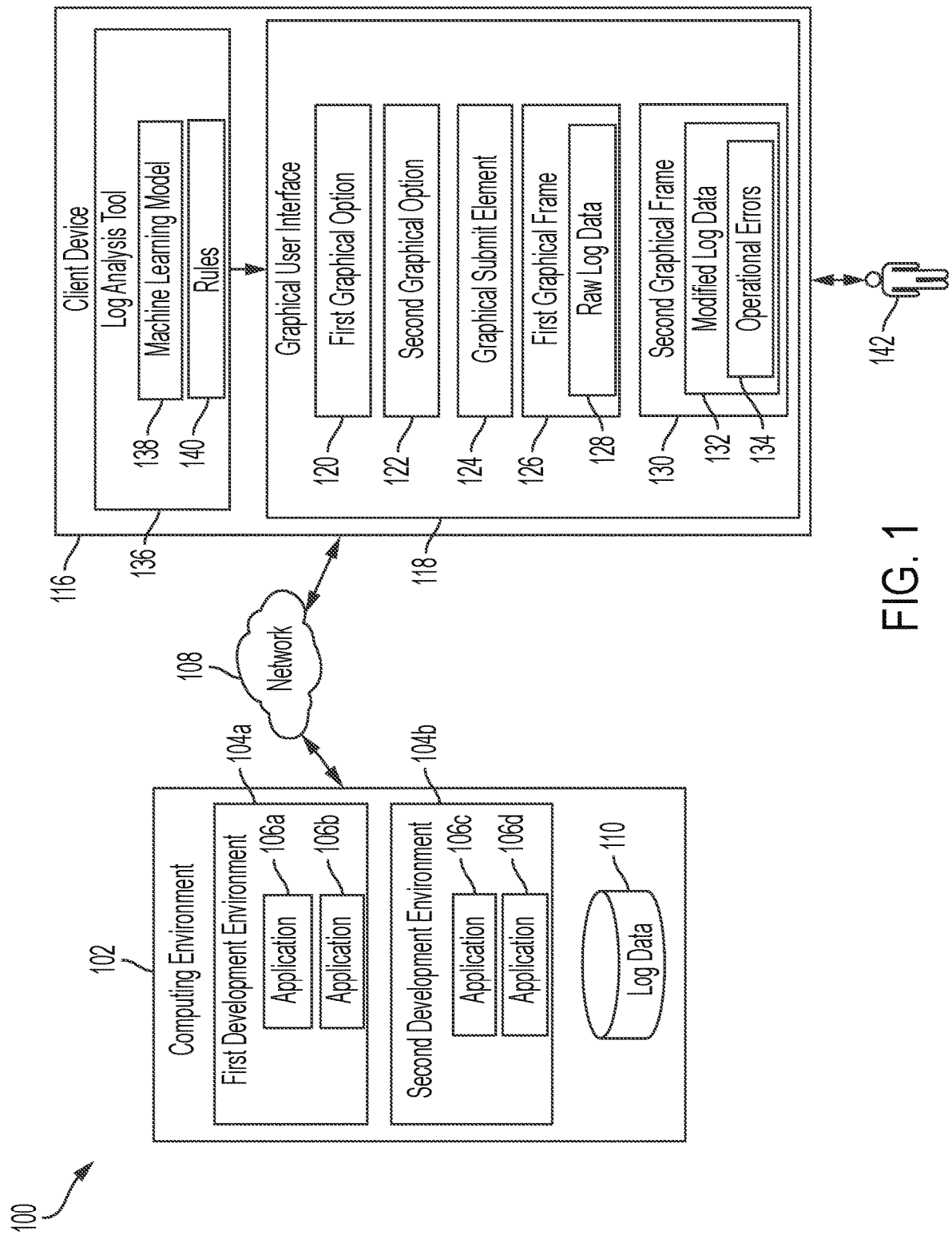
FIG. 1 shows a block diagram of an example of a system for implementing some aspects of the present disclosure.

Certain aspects and examples of the present disclosure relate to a graphical user interface and a log analysis tool for analyzing log data to identify errors associated with executing a software application. The log analysis tool may automatically identify the errors and highlight the errors for a developer via modified log data displayed for the developer on the graphical user interface. For example, a client device can include the log analysis tool. The client device may be a laptop, tablet, smartphone, desktop computer, or other suitable device. The client device can connect, via a network such as a local area network (LAN) or the internet, with a computing environment to retrieve a log file that can include log data. The computing environment can be a collection of computer machinery, data storage devices, workstations, software applications, networks, or a combination thereof that can support a processing or exchange of electronic information. The computing environment can include development environments, which can be workspaces that can provide processes or programming tools that can be used to develop source code for an application or other suitable software product. Each development environment can be used to develop and execute applications. The applications can be any type of software program. The log data can be produced during execution of an application in a development environment and can contain information about events that occurred during the execution of the application in the development environment. For example, an event can be a function performed by the application to provide a user of the application with a result. The log data can include errors, warnings, or other suitable information associated with the application performing the function.

The client device may obtain the log data based on search criteria selected by the user via the graphical user interface. For example, the user can select a particular development environment from among multiple development environments and a particular application from among multiple applications. Additionally, the user may select a search timeframe. The search timeframe can be a timeframe during which the application was executing in the development environment, and therefore the log data obtained by the client device can be the log data produced during the timeframe. The user may further select a total, which can be a total number of lines of log data obtained, a total number of log events obtained, or other suitable total. Additionally, the user can select one or more log groups associated with the particular application in the particular development environment. In an example, the one or more log groups can group log data associated with certain events or functions. The selection of the application, the development environment, the total, the search timeframe, and the one or more log groups via the graphical user interface can decrease an amount of log data retrieved by the client device to increase a speed of processing the log data and to provide the user with highly relevant log data.

After the client device obtains the log data, the log analysis tool can analyze the log data. For example, the log analysis tool can analyze the log data to identify log entries that are indicative of errors, such as operational errors related to the execution of the application. The log analysis engine may execute a rules engine and/or a machine-learning model to identify the log entries indicating the errors. The log analysis tool may then output a modified version of the log data in the graphical user interface, where the modified version of the log data is configured to highlight the log entries for a user. This may help the user identify a root cause of an operational problem associated with the application.

Additionally, the log analysis tool can analyze the log data to identify certain types of content. For example, the log analysis tool may identify markup language content in the log data such as extensive markup language (XML), Hyper-Text Markup Language (HTML), Bulletin Board Code (BBC), or other suitable markup languages. The log analysis tool may further identify uniform resource locators (URLs), JavaScript Object Notation (JSON), or other types of content in the log data. The log analysis tool can provide the log data to the user, via the graphical user interface, in a raw format. The log analysis tool can further provide the log data to the user, via the graphical user interface, in a modified format. The modified format can present the operational errors, markup language content, URLs, JSON, other suitable content, identified in the log data in a format that is different than the raw format. For example, the different types of content can be in different colors, bolded, highlighted, reorganized, tabbed and spaced, or otherwise changed from the raw format. The modified format may enable the user to identify and digest important information in the log data more efficiently.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 shows a block diagram of an example of a system 100 for implementing some aspects of the present disclosure. The system 100 can include a network 108 such as a local area network (LAN) or the Internet, over which a client device 116 can establish communication with a computing environment 102. The computing environment 102 can be a distributed computing environment, such as cloud computing environment or a computing cluster. The cloud computing environment can provide computing resources such as networks, servers, storage, various applications, various services, etc. The computing environment 102 can include a plurality of development environments 104a-b that can execute a plurality of applications 106a-d. The plurality of development environments 104a-b can be workspaces in which a user 142, such as a software developer, can make changes to the plurality of applications 106a-d without disrupting live environments running the plurality of applications 106a-d. The plurality of development environments 104a-b can be used for designing, programming, debugging, testing, or otherwise interacting with the plurality of applications 106a-d. The plurality of applications 106a-d can be computer programs designed to carry out specific tasks.

In an example, the computing environment 102 can include a first development environment 104a executing applications 106a-b, and the computing environment 102 can include a second development environment 104b executing applications 104c-d. The computing environment 102 can include log data 110 associated with executing applications 106a-b in the first development environment 104a and the log data 110 associated with executing applications 106c-d in the second development environment 104b. The log data 110 can be automatically produced and may be a time-stamped documentation of events associated with executing the plurality of applications 106a-d in the plurality of development environments 104a-b. The log data 110 may be generated by the plurality of applications 106a-d, or the computing environment 102 can be configured to generate the log data 110 during execution of the plurality of applications 106a-d in the plurality of development environments 104a-d. For example, a log file may contain log data 110 related to errors, requests and response payloads, time durations, status updates, performance metrics, debugging cues, other suitable events related to the application 106a, other suitable events related to executing the application 106a, or a combination thereof. By documenting events as the log data 110, the log data 110 can, for example, provide the user 142 with an improved understanding of the execution of the application 106a in the first development environment 104a.

In an example, the cloud computing environment 102 can be Amazon Web Services (AWS®). The client device 116 may establish connection with AWS, via the network 108, by performing a single-sign on (SSO) process configured to authenticate with AWS. As part of the SSO process, the user 142 may provide authentication credentials via a graphical user interface 118. The user 142 providing the authentication credentials can cause a token to be generated for the client device 116. In some examples, the token may be valid for a predefined time period, such as one hour. The client device 116 can use the token to establish a connection to AWS, because the token can authenticate the client device 116 with AWS. In some examples, the SSO process can be used to establish connection with other suitable computing environments, cloud computing environments, or the like.

Additionally, in the example in which the computing environment 102 can be AWS, the plurality of development environments 104a-b can be cloud computing services such as Amazon Elastic Cloud Compute (EC2), AWS CloudTrail, AWS Lambda, or Route 53. The plurality of development environments 104a-b can execute the plurality of applications 106a-d to produce the log data 110.

The log data 110 can be stored and managed in the cloud computing environment by a cloud computing service. In some examples, the cloud computing service can be Amazon CloudWatch Logs. The client device 116 can therefore interface with Amazon Cloudwatch Logs to retrieve the log data 110. The cloud computing service (e.g., Amazon Cloudwatch Logs) may store the log data 110 as log groups. A log group can be a set of log streams that are grouped together based on one or more shared characteristics between the log streams. Log groups may be organized by development environment, geographical region, event type, application, or any combination thereof. For example, the log data 110 may be divided into multiple log groups corresponding to the multiple development environments 104a-b, where each log group stores the log data for one of the development environments 104a-b. As another example, the log data 110 may be divided into multiple log groups corresponding to the multiple geographical regions, where each log group stores the log data for one of the geographical regions. Each of the log groups can be include a set of log streams indicating sequences of log events associated with, for example, executing the application 106a in the first development environment 104a. In some examples, the log groups can be divided by types of log events in the log streams. For example, a log group can include log streams with sequences of log events related to errors, and another log group can include log streams with sequences of log events related to user requests. Thus, there can be a plurality of log groups associated with the execution of the application 106a in the first development environment 106a. Additionally, in some examples, a new log group can be created to store the log data 110 associated with each development environment that executes the application 106a.

In some examples, the client device 116 can include a log analysis tool 136. The log analysis tool 136 is executable to generate the graphical user interface 118 configured to assist in analyzing the log data 110. The graphical user interface 118 can be displayed on the client device 116, which can be a phone, tablet, laptop, or other suitable client device. The graphical user interface 118 can include various graphical options corresponding to search criteria (e.g., filter critera). These can allow the user to selectively filter the log data 110 to retrieve a set of log data that meets the user's requirements. For example, the graphical user interface 118 can include a first graphical option 120 that can allow the user 142 to select a particular development environment from among the plurality of development environments 104a-b. In an example, the particular development environment can be the first development environment 104a. The graphical user interface 118 can also include a second graphical option 122 that can allow the user 142 to select a particular application from among the plurality of applications 106a-d. In an example, the particular application can be the application 106a. After setting the search criteria (e.g., by selecting a target development environment and a target application), the user 118 can select a submit element 124 to cause the client device 116 to retrieve a subset of the log data 110 that satisfies the search criteria from the computing environment 102.

For example, the log analysis tool 136 can detect the selection of the graphical submit element 124 and responsively issue an application programming interface (API) call or other suitable request, which can be communicated from the client device 116 to the computing environment 102 via the network 108. The API call or other suitable request can be a request for a subset of the log data 110 that satisfies the search criteria. In an example, the log analysis tool 136 can be integrated with CloudWatch Software Development Kit or another suitable Software Development Kit (SDK). By integrating the log analysis tool 136 with a relevant SDK, the client device 116 can trigger a correct set of API calls based on selections made by the user 142 via the graphical user interface 118.

In some examples, the graphical user interface 118 can include additional graphical options corresponding to search criteria that can be selected by the user 142. The additional graphical options can be used to further refine the search for the relevant log data. The API call or other suitable request may obtain the log data 110 based on the application 106a selected by the user 142, the first development environment 104a selected by the user 142, and further based on any other suitable search criteria. For example, the user 142 may select a timeframe, a total number of results to return, one or more log groups, or a combination thereof via the graphical user interface 118. The timeframe can be a previous time window during which the application 106a executed in the first development environment 104a. The total can be a total number of results provided to the user via the graphical user interface 118. The one or more log groups can be associated with types of log data. Therefore, the user may narrow the amount of log data or the type of log data retrieved by the client device 116 from the computing environment 102 by selecting the timeframe, the total, and one or more log groups, or a combination thereof.

The graphical user interface 118 can further include a first graphical frame 126 and a second graphical frame 130. The first graphical frame 126 can provide the user with raw log data 128. For example, log data 110 retrieved from the application 106a in the first development environment 104a can be provided in the first graphical frame 126 in a same or a similar format as the log data 110 may be provided in the computing environment 102. The second graphical frame 130 can provide the user with modified log data 132. In some examples, the modified log data 132 can be a version of the raw log data 128 that has been reformatted, reorganized, truncated, expanded, or otherwise adjusted. For example, the modified log data 132 can provide the log data 110 reorganized into chronological order or another suitable sequence. The modified log data 132 may highlight log entries associated with operational errors 134 by providing the log data 110 in an altered format. For example, the modified log data 132 can color code the log entries associated with operational errors 134 in a first color (e.g., red). In some examples, the modified log data 132 may also provide JSON content, XML content, URLs, or other suitable content in the log data 110 in a changed format. For example, additional spaces, additional lines, or other formatting changes can be made to the JSON content, XML content, URLs, etc., to make them more easily readable as compared to their raw format (which may be condensed with minimal spaces or tabs). Additionally, different types of content can be color coded in different colors. For example, the JSON content can be in a second color, the XML content can be in a third color, and the URLs can be in a fourth color. The modified log data 132 can be easier for the user to read and understand, which can make it easier for the user to locate important log data.

In some examples, the log analysis tool 136 can, subsequent to detecting a selection of the graphical submit element 124 and obtaining log data 110, analyze the log data 110. The log analysis tool 136 may analyze the log data 110 to identify data content types (e.g., content formats) therein such as JSON, XML, URLs, etc. The log analysis tool 136 can analyze the log data 110 using rules 140. For example, the rules 140 can be a predefined a set of words, symbols, or other suitable indicators that may be found in the JSON, XML, or other content to identify that content type.

The log analysis tool 136 can also analyze the log data 110 using the rules 140 to identify log entries associated with operational errors 134. For example, a rule 140 can define that if a log entry includes certain words, phrases, or symbols (e.g. "Warn", "SerializationFailedException", etc.), the log entry may be associated with the operational errors 134. The rules 140 may further define that the log data 110 associated with the log entry including the certain words, phrases, or symbols can be highlighted to enable the user 142 to locate the operational errors 134. Additionally, after a certain word, phrase, or symbol is identified to initially recognize an operational error 134, the rules 140 may further define additional words, phrases, symbols, etc. indicative of a particular operational error or a particular type of operational error. For example, "Warn" in the log data 110 can be followed by a series of numbers or letters corresponding to the particular operational error or the particular type of operational error. The log analysis tool 136 may highlight the type of operational error a particular color or the log analysis tool 136 may reorganize the log data 110 to group log entries associated with the type of operational error. Therefore, the log analysis tool 136 can identify, analyze, modify, or a combination thereof the log data 110 prior to providing the log data 110 to the graphical user interface 118 for display.

In some examples, the log analysis tool 136 can include a machine learning model 138 for use additionally or alternatively to the rules 140 in identifying operational errors 134. The machine learning model 138 can include one or more neural networks, support vector machines, decision trees, or any combination of these. The machine learning model 138 can be a trained machine learning model for analyzing the log data 110 to identify operational errors 134. For example, the machine learning model 138 can be trained using previous log files associated with executing any of the plurality of applications 104a-d in any of the plurality of development environments 104. The previous log files can be a sample input for training the machine learning model 138 and operational errors 134 associated with the previous log files can be a sample output for training the machine learning model 138. During the training process, the machine learning model 138 can determine a set of attributes associated with the log data 110 that can indicate or predict operational errors 134. Therefore, the machine learning model 138 may compare multiple sets of log data to identify operational errors, predict future operational errors, or provide other suitable insights associated with the log data 110.

In some examples, the graphical user interface 118 may further include a graphical option to automatically resolve an operational error 134. The user can select the graphical option, and, in response, the log analysis tool 136 may automatically determine a strategy for resolving the operational error 134. The strategy can be determined based on historical data related to changes made to an application to resolve the same or a similar operational error. For example, the log analysis tool 136 may access a data repository including predefined strategies for resolving the operational errors 134. Additionally or alternatively, the log analysis tool 136 can define strategies for resolving operational errors. For example, the rules 140 that can be used by the log analysis tool 136 to identify the operational errors 134 can further define a strategy for resolving the operational errors 134 based on a particular operational error or a type of operational error. The machine learning model 138 may also be used to identify or predict a strategy with a highest chance of success. For example, the machine learning model 138 can be trained with a set of operational errors and a set of solutions associated with set of operational errors. The set of solutions can be series of operations performed by a developer or automatically applied by a computer to alter a software application to solve an operational error. Thus, during training, the machine learning model 138 can determine operations or sets of operations best suited to resolve operational errors 134.

In some examples, the log analysis tool 136 may automatically execute the strategy to resolve the operational error 134. The log analysis tool 136 may interact with the computing environment 102 to implement the strategy. For example, the log analysis tool 136 can interact with the computing environment 102 to alter the application. The log analysis tool 136 may further determine a result of the strategy implemented by analyzing log data 110 associated with the altered application executing in a development environment. Additionally, In some examples, the graphical user interface 118 can display the strategy, a result of executing the strategy, or updated log data based on the strategy to the user 142.

In some examples, the log analysis tool 136 can automatically search through groups in the computing environment 102 to identify a particular group having the target application 106a selected by the user 142. For example, the plurality of applications 106a-d can be divided into a plurality of groups in the computing environment 102. The groups can correspond to geographical regions in which a node associated with the target application 106a is located. For example, Ohio can be a first geographical region and West Virginia can be a second geographical region, and the log data 110 for these two regions may be stored and maintained separately from each other. Normally, a user 142 may need to search through various groups and subgroups to find the target application, which can be time consuming and difficult. But in some examples, the log analysis tool 136 can automatically and recursively search through each group and subgroup in the computing environment 102 to identify a group corresponding to the target application 106a. For example, the log analysis tool 136 can automatically search the applications associated with a first geographical region, determine that the application is not in associated with the first geographical region, and then do the same for the second geographical region. The log analysis tool 136 can repeat this process, iteratively searching through the application groups and subgroups, until it finds the target application 106a selected by the user 142. The log analysis tool 136 can then use the identified group to obtain the applicable log data. For example, the log analysis tool 136 can transmit a query to the computing environment 102 for retrieving the log data 110. The query can be a request for the log data 110 based on the selections by the user 142 in the graphical user interface 118 and further based on the application's group. For example, the query may specify that the application 106a is assigned to the second region. Therefore, the log analysis tool 136 can determine that the computing environment 102 includes groups, can search the groups to identify which group corresponds to the application 106a, and can transmit the query that includes the group corresponding to the application 106a to efficiently obtain the log data 110.

Thus, the log analysis tool 136 can quickly and efficiently obtain relevant log data 110, analyze it, and highlight operational errors 134 and other information for the user 142. The search criteria can narrow the log data 110 such that the system 100 can quickly provide the user 142 with highly relevant log data. The log analysis tool 136 can further assist in resolving the operational errors 134 to improve the functionality of the computing environment 102.

Figure 2:
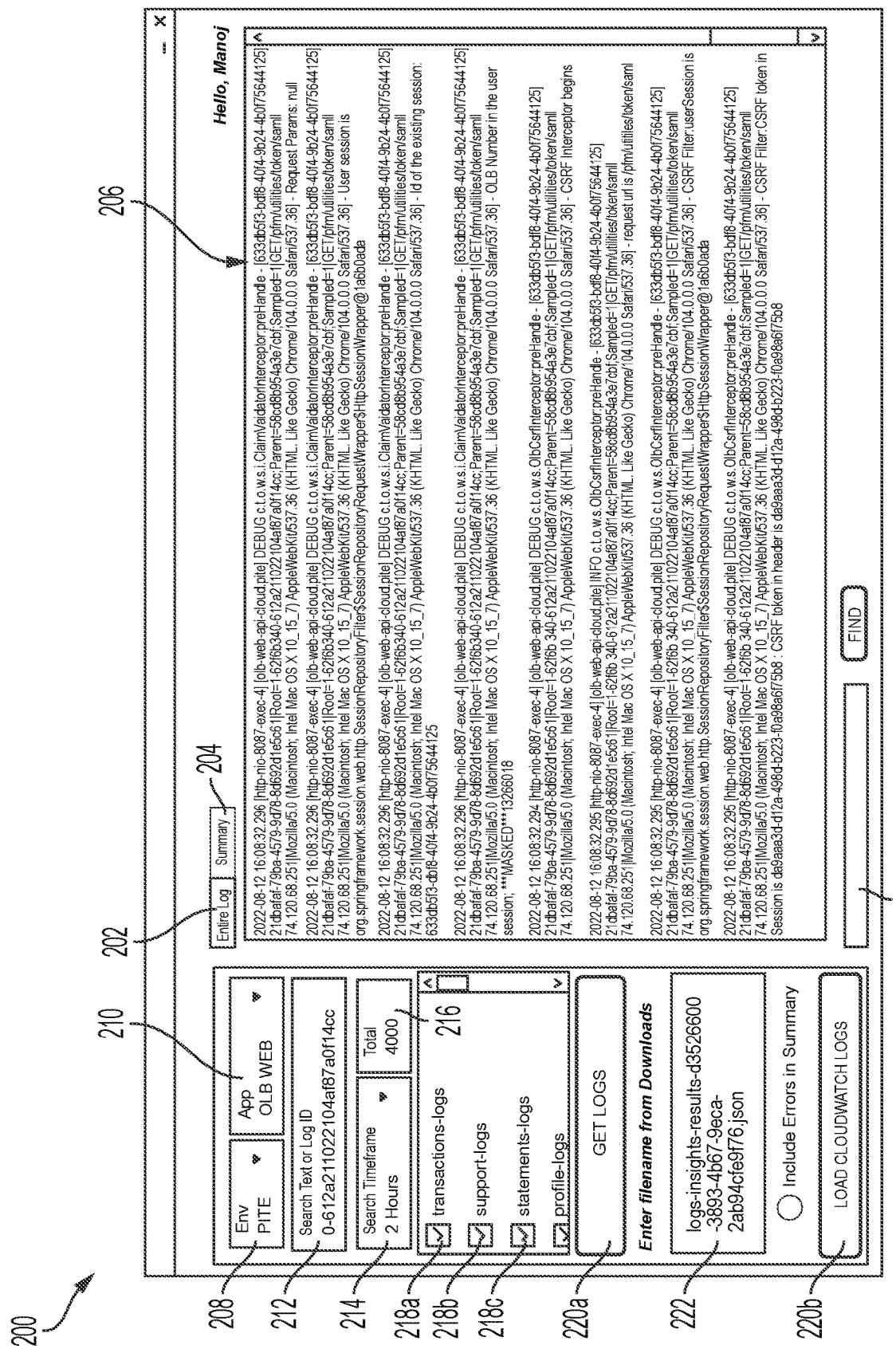
FIG. 2 shows an example of a graphical user interface according to some aspects of the present disclosure.

FIG. 2 shows an example of a graphical user interface 200 according to some aspects of the present disclosure. The graphical user interface 200 can be displayed on a client device for a user and can be associated with a log analysis tool. For example, the graphical user interface 200 can correspond to the graphical user interface 118 of FIG. 1.

The graphical user interface 200 can include a first graphical option 208 for allowing the user to choose a development environment. For example, the first graphical option 208 can be a drop-down menu extended by a user selecting the first graphical option 208. Referring back to FIG. 1, the drop-down menu can include identifiers of the first development environment 104a and the second development environment 104b. The user can select, via the graphical user interface 200, the first development environment 104a or the second development environment 104b from the drop-down menu. In some examples, the user may type a name or other suitable identification of a development environment into the first graphical option 208 or otherwise select the development environment using the first graphical option 208.

Additionally, a second graphical option 210 on the graphical user interface 200 can allow a user to select an application. In some examples, the second graphical option 210 can be a drop-down menu extended by a user selecting the second graphical option 210, a space for a user to type in a name or identification of the application, or other suitable graphical option for allowing a user to select the application. In some examples, the second graphical option 210 can provide a set of applications associated with the development environment selected in the first graphical option 208. For example, if the user selects the first development environment 104a via the first graphical option 208, the second graphical option 210 can include application 106a and application 106b.

The graphical user interface 200 can further provide additional graphical options for selection by the user. Log data presented by the graphical user interface 200 can be based on the selections of graphical options by the user. For example, the user can select a timeframe via a search timeframe option 214 included on the graphical user interface 200. The search timeframe option 214 can provide timeframe options for the user or the user may enter a timeframe into the search timeframe option 214. In an example, the timeframe can be at least one hour or up to twelve hours.

Additionally, the user can select a total number of results to receive via a total option 216 included on the graphical user interface 200. The total number of results can be presented by the graphical user interface 200 in a summary view of the log data, in an entire log view of the log data, or a combination thereof. The number of results can be a number of lines of log data or a number of log events (e.g., log entries). In some examples, the user can type a number into the total option 216 or otherwise provide the number via the total option 216.

In some examples, the user can further select one or more log groups via log group options 218a-c. In an example, the graphical user interface 200 can present the one or more log groups based on the development environment selected in the first graphical option 208, the application selected in the second graphical option 210, or a combination thereof. The graphical user interface 200 may provide the one or more log groups as a list with graphical options to select any number of the log group options 218a-c. Additionally, the graphical user interface 200 can include a search text or log ID option 212 for a user to manually enter text or a log ID associated with the log data desired by the user.

The graphical user interface 200 may also include one or more graphical submit elements 220a-b. The graphical submit element 220a can be used to retrieve log data that fulfills the search criteria specified using the first graphical option 208, the second graphical option 210, the total option 216, the search timeframe option 214, the log group options 218a-c, the search text or log ID option 212, or any combination of these. In some examples, at least one of the first graphical option 208, the second graphical option 210, the total option 216, the search timeframe option 214, the log group options 218a-c, or the search text or log ID option 212 can be required to be selected by the user prior to the user selecting the graphical submit element 220a.

If the log data to be searched is stored on a remote computing environment (e.g., computing environment 102), the user can select the graphical submit element 220a to trigger an API call or other suitable request for causing the client device to retrieve log data that fulfills the search criteria from the computing environment. If the log data to be searched is stored locally (e.g., in one or more log files) on the same computer that is executing the log analysis tool, the user can input a filename or location of the log data on the local computer using input option 222 and select the graphical submit element 220*b*. Alternatively, the user can identify the log data to be searched by dragging and dropping the log file to the input option 222.

By selecting the graphical submit elements 220*a-b*, the user can cause the log analysis tool to retrieve a subset of the log data that fulfills the search criteria selected by the user. The log analysis tool may automatically analyze the received subset of log data for data formats, operational errors, etc. to identify important information in the log data. The log analysis tool may further modify the received subset of log data by emphasizing data formats, operational errors, etc. or by shortening the log data to create summarized log data.

The graphical user interface 200 can output raw log data 206 in a first graphical frame 202. The raw log data 206 can be the original log data, in the format that it was received from the remote computing environment or stored in a local log file. The graphical user interface 200 can also output the summarized log data in a second graphical frame 204. This may allow the user to easily toggle between the raw log data 206 and the summarized log data. The graphical user interface 200 may further include a search bar 224 for searching the raw log data 206 in the first graphical frame 202 or for searching the summarized log data in the second graphical frame 204.

Figure 3:
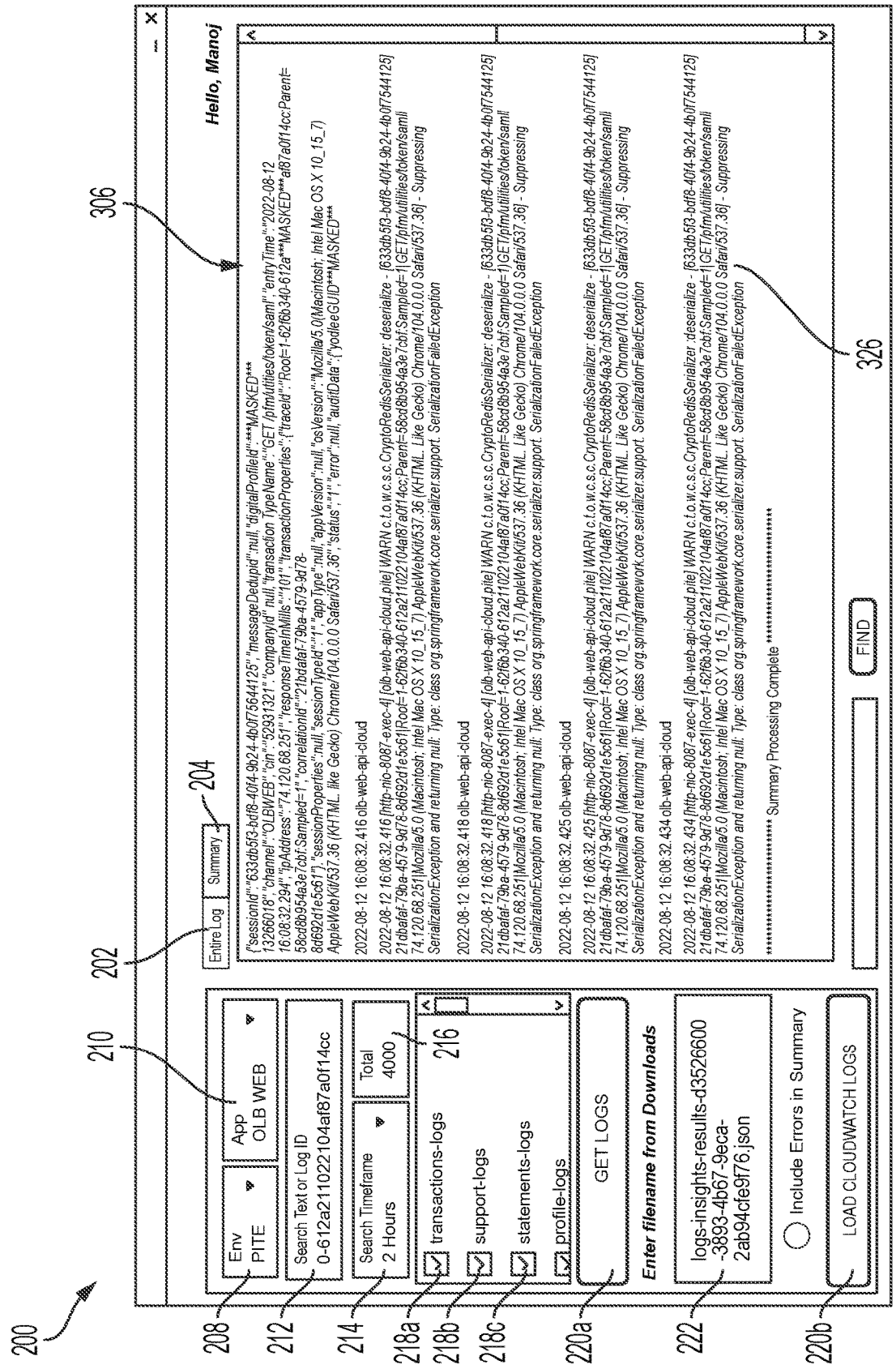
FIG. 3 shows an example of a graphical user interface outputting summarized log data that highlights operational errors according to some aspects of the present disclosure.

FIG. 3 shows an example of a graphical user interface 200 in which log data has been modified according to some aspects of the present disclosure. The log data can be retrieved and modified by a log analysis tool and then presented via the second graphical frame 204 in the graphical user interface 200. As illustrated, the second graphical frame 204 can include summarized log data 306. The summarized log data 306 can be a modified version of the log data for displaying one or more operational errors 326. The one or more operational errors 326 can be displayed in a format that can be easy to read for a user. For example, the one or more operational errors 326 can be emphasized by displaying the one or more operational errors 326 in a first color such as red.

Figure 4:
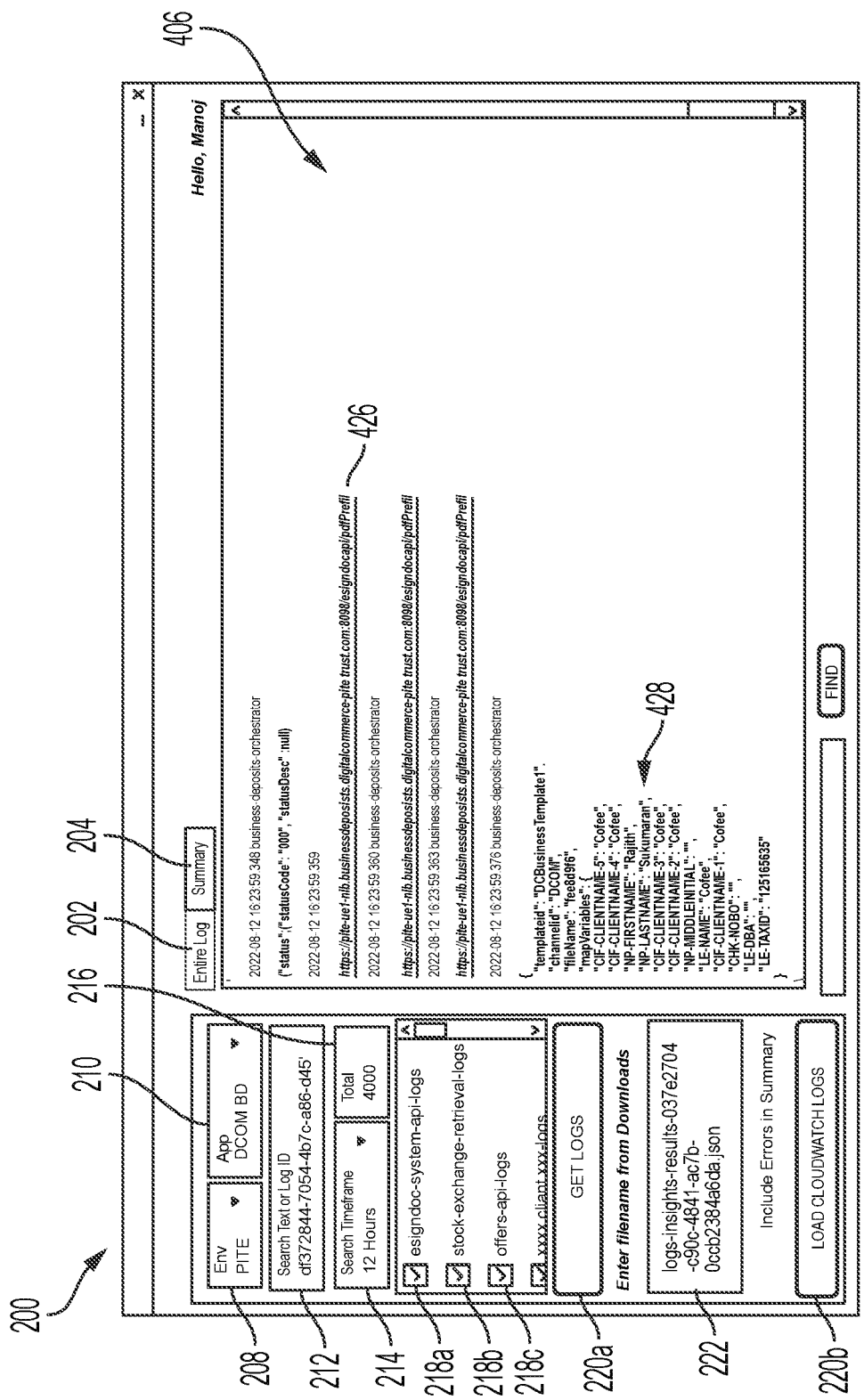
FIG. 4 shows an example of a graphical user interface outputting summarized log data with reformatted content according to some aspects of the present disclosure.

FIG. 4 shows an example of a graphical user interface 200 outputting summarized log data 406 with reformatted content according to some aspects of the present disclosure. The log data can be retrieved and organized by a log analysis tool and then presented via the second graphical frame 204 in the graphical user interface 200. As illustrated, the second graphical frame 204 can include summarized log data 406, which can include log data in various data formats. For example, the log data can be formatted as JSON content 428, XML content, URLs 426, etc. As illustrated, the summarized log data 406 can include URLs 426. The URLs 426 can be emphasized by, for example, providing the URLs in a second color in the summarized log data 406. Also, as illustrated, the summarized log data 406 can include JSON content 428. The summarized log data 406 can provide the JSON content 428 with spaces, indentation, new lines, or other suitable format changes that may not be in the raw log data. The format changes to the JSON content 428 in the summarized log data 406 can make the JSON content 428 easier for the user to read and understand. Additionally, the JSON content 428 can be emphasized by displaying the JSON content 428 on the graphical user interface 200 in a third color.

Figure 5:
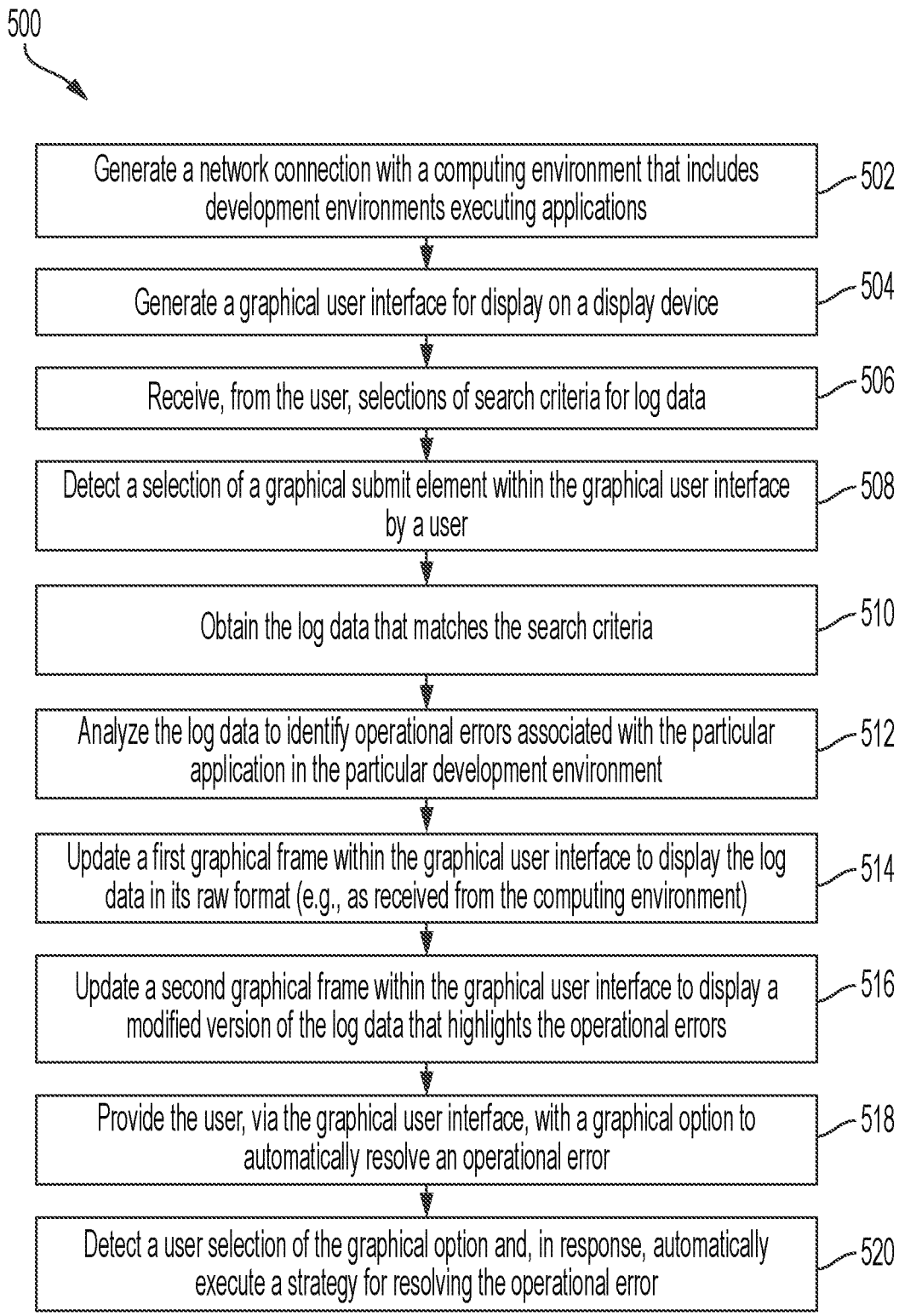
FIG. 5 shows a flowchart of an example of a process for implementing some aspects of the present disclosure.

FIG. 5 shows a flowchart of an example of a process for implementing some aspects of the present disclosure. In some examples, the client device 116 can perform the process shown in FIG. 5 to implement some aspects of the present disclosure. The client device 116 may perform some or all of the process by executing the log analysis tool 136. Other examples may include more steps, fewer steps, different steps, or a different order of the steps than is shown in FIG. 5. The steps of FIG. 5 are described below with reference to the components of FIG. 1 described above.

In block 502, the client device 116 can generate a network connection with a computing environment 102 that includes development environments 104*a-b* executing applications 106*a-d*. The network connection can enable communication between the computing environment 102 and the client device 116. The network connection can be made via a network 108, such as a local area network (LAN) or the Internet. The computing environment 102 can be a cloud computing environment such as Amazon Web Services. The development environments 104*a-b* can include hardware, software, or other suitable computing resources for developing and executing the applications 106*a-d*. The computing environment 102 can include log data 110 that can be producing during execution of the applications 106*a-d* in the development environments 104*a-b*.

In block 504, the client device 116 can generate a graphical user interface 118 for display on a display device. In some examples, the client device 116 can include the display device or the client device 116 can be communicatively coupled to the display device. The display device can be a liquid crystal display (LCD), light-emitting diode (LED) display, or another type of display for displaying the graphical user interface 118.

The graphical user interface 118 can include any number and combination of search options for defining search criteria usable to retrieve log data of interest to the user 142. For example, the graphical user interface 118 can include a first graphical option 120 for allowing a user 142 to select a first development environment 104*a* from a plurality of development environments 104*a-b*. The graphical user interface 118 can further include a second graphical option 122 for allowing the user 142 to select an application 106*a* from a plurality of applications 106*a-d*. Additionally, the graphical user interface 118 can provide a graphical submit element 124 to the user 142.

The graphical user interface 118 can further include a first graphical frame 126 for outputting raw log data 128 and a second graphical frame 130 for outputting modified log data 132. The graphical user interface 118 can be configured to allow the user 142 to toggle between the first graphical frame 126 and the second graphical frame 130. In some examples, the graphical user interface 118 can include additional graphical frames. The additional graphical frames may include alternate versions of modified log data 132. For example, an alternate version of modified log data 132 can emphasize a specific kind of error in log data or emphasize other suitable content. Additionally, the additional graphical frames can provide different views of different portions of the log data 110 or the additional graphical frames can provide other suitable data associated with the application 106*a* or the first development environment 104*a*.

In block 506, the client device 116 can receive, from a user 142, selections of search criteria for log data 110. The user 142 can be a developer or other suitable user. The search criteria can include the plurality of development environments 104*a-b* and the plurality of applications 106*a-d*, in which the user 142 can select the first development environment 104*a* via the first graphical option 120 and the user can select the application 106*a* via the second graphical option 122. The search criteria can further include a timeframe associated with executing the application 106*a* in the first development environment 104*a*. The user can select the timeframe via a timeframe option provided by the graphical user interface 118. For example, the application 106a can be executed in the first development environment 104a for four hours. The user 142 may select a timeframe of one hour to receive the log data 110 associated with a last hour of the four hours. In some examples, the timeframe option can be a timeframe of at least one hour or up to a timeframe of twelve hours. Additionally, the search criteria can include a total associated with a total number of results. The graphical user interface 118 can provide the user 142 with a total option for selecting the total. For example, the log data 110 associated with the application 106a in the first development environment 104a can include ten thousand lines of the log data 110. The user 142 can select four thousand for the total to receive, via the graphical user interface 118, the first four thousand lines of the ten thousand lines of the log data 110.

The client device 116 may further receive search criteria in the form of a search text or a log ID from the user 142 via a search text or log ID option in the graphical user interface 118. The search text can include key words or numbers associated with a log file, log event, the log data 110, or the like. The log ID can be used to identify and retrieve a specific log file, log group, log event, or other suitable log information. The graphical user interface 118 may also provide the user with log group options. Examples of log groups can include transaction logs, support logs, statements logs, profile logs, etc. Therefore, the selections of search criteria from the user 142 can further include one or more selections of the log group options.

In block 508, the client device 116 can detect a selection of a graphical submit element 124 within the graphical user interface 118 by the user 142. The selection of the graphical submit element 124 can be made by the user clicking on or otherwise interacting with the graphical submit element 124 in the graphical user interface 118. In some examples, the graphical submit element 124 may be disabled until one or more required search criteria are selected, at which point the graphical submit element 124 may become enabled and capable of being pressed. The required search criteria may include any of the search criteria described above. In response to detecting a selection of the graphical submit element 124, the client device 116 can transmit an application programming interface (API) call or other suitable request to the computing environment 102 to retrieve the log data 110. The API call or other suitable request can include the search criteria, so that the computing environment 102 can identify a subset of the log data 110 that matches the search criteria and return it to the client device 116.

Additionally or alternatively, the graphical user interface 118 can provide a second graphical submit element and the client device 116 may detect a selection of the second graphical submit element by the user 142. The second graphical submit element can allow the user to select one or more locally stored log files for searching. The second graphical submit element can trigger the log analysis tool 136 to obtain and analyze the one or more locally stored log files. For example, the user 142 can enter a filename for a log file stored on the client device 116 and select the second graphical submit element. The log file may have been previously downloaded from the computing environment 102 and stored on the client device 116. In response to detecting the selection of the second graphical submit element, the graphical user interface 118 can access the locally stored log file(s) and generate the modified log data 132 based thereon.

In block 510, the client device 116 can obtain the log data 110 that matches the search criteria. The client device 116 can obtain the log data 110 in response to detecting the selection of the graphical submit element 124. In some examples, the log data 110 obtained can be an entirety of the log data 110 associated with an application 106a in the first development environment 104a. In other examples, the log data 110 can be a subset of the log data due to the search criteria selected by the user. For example, a subset of the log data can be based on the timeframe, the total, or the one or more log groups selected by the user. In some examples, the subset of the log data may be obtained faster than an entirety of the log data for the application 106a and provide more relevant results due to the selections of the search criteria by the user.

In block 512, the client device 116 can analyze the log data 110 to identify operational errors 134, for example operational errors associated with the application 106a in the first development environment 104a. In some examples, the client device 116 can analyze the log data 110 using a predefined set of rules 140. For example, the predefined set of rules 240 can include statements, keywords, or other suitable indicators associated with operational errors 134. The client device 116 can flag or otherwise identify the statements, keywords, etc. based on the predefined set of rules 140 during analysis of the log data 110.

Additionally or alternatively, the client device 116 can execute a trained machine-learning model 138 to identify the operational errors 134. The trained machine-learning model may analyze multiple log groups, log events, or other suitable data entries individually or in combination to provide additional insight into the operational errors 134, identify more complex operational errors, or predict future operational errors.

In block 514, the client device 116 can update a first graphical frame 126 within the graphical user interface 118 to display the log data 110 in its raw format (e.g., as received by the computing environment 102). Raw log data 128 may include operational errors 134, extensive markup language (XML), uniform resource locators (URLs), JavaScript Object Notation (JSON), application programming interface (API) calls, or other suitable data formats or information. The raw log data 128 may include information, data, or data formats that may be excluded from a modified version of the log data 110.

In block 516, the client device 116 can update a second graphical frame 130 within the graphical user interface 118 to display a modified version of the log data that highlights the operational errors 134 (e.g., associated with the application 106a in the first development environment 104a). In some examples, modified log data 132 may exclude one or more portions (e.g., lines, words, or symbols) of the raw log data 128 to provide a simplified version of the raw log data 128. Additionally, the operational errors 134 may be highlighted by changing the color, highlighting, bolding, underlining, or otherwise emphasizing portions of the log data associated with the operational errors 134. The modified version of the log data can further include log data that has been reformatted. For example, JSON, XML, URLs, or other suitable content or data can be provided in a format that can be read and understood by the user more easily by adding in spaces, new lines, or other suitable format changes. Additionally, the modified version of the log data can include log data that has been reorganized. For example, the JSON, XML, URLs, or other suitable content or data can be reorganized into a more logical sequence in the modified version of the log data or portions of content that are related can be reorganized to be closer together in the modified version of the log data.

In an example, the client device 116 can identify JSON, XML, URLs, and operational errors 134 and color code them differently to make them easily distinguishable for the user. For example, the JSON content can be displayed on the graphical user interface 118 in the modified log data 132 in a first color, the XML content can be displayed on the graphical user interface 118 in the modified log data 132 in a second color, the URLs can be displayed on the graphical user interface 118 in the modified log data 132 in a third color, and the operational errors 134 can be displayed on the graphical user interface 118 in the modified log data 132 in a fourth color. Of course, other examples may use other color coding schemes.

Additionally, in some examples, a plurality of data entries in the log data 110 can be color coded for display on the graphical user interface 118 in the modified log data 132. Each data entry of the data entries can be color coded based on a format on the data entries to provide the user with different data formats in different colors. Providing the user with different data formats in different colors can help the user locate data formats to find information contained in the data entries more quickly.

In block 518, the client device 116 can provide the user 142, via the graphical user interface 118, with a graphical option to automatically resolve an operational error 134. A strategy for automatically resolving the operational error can be determined upon the user 142 selecting the graphical option or the strategy for resolving the operational error 134 can be determined prior to the user 142 selecting the graphical option. The strategy can be determined based on historical data related to changes made to an application to resolve the same or a similar operational error. For example, the log analysis tool 136 may access a data repository including predefined strategies for resolving the operational errors 134. Additionally, or alternatively, log analysis tool 136 can define strategies for resolving operational errors 134. For example, the rules 140 that can be used by the log analysis tool 136 to identify the operational errors 134 can further define a strategy for resolving the operational errors 134 based on a particular operational error or a type of operational error. The machine learning model 138 may also be used to identify or predict the strategy. For example, the machine learning model 138 can be trained with a set of operational errors and a set of solutions associated with set of operational errors. The set of solutions can be series of operations performed by the user 142 or automatically applied by a computer to alter a software application to solve an operational error. Thus, during training, the machine learning model can determine operations or sets of operations best suited to resolve operational errors 134.

In block 520, the client device 116 can detect the user selection of the graphical option and, in response, automatically execute the strategy for resolving the operational error 134. For example, the log analysis tool 136 may interact with the computing environment 102 to implement the strategy, for example, by transmitting commands to an application programming interface (API) of the computing environment 102. In an example, the log analysis tool 136 can implement the strategy by transmitting commands to the computing environment 102, where the commands are configured to modify one or more settings of the application. After implementing the strategy, the log analysis tool 136 may further determine a result of the strategy by analyzing log data 110 associated with the altered application executing in a development environment. The graphical user interface 118 may display information related to the strategy or provide updated log data after the strategy has been implemented. This may help a developer confirm whether the strategy was successful in resolving the operational error 134.

Figure 6:
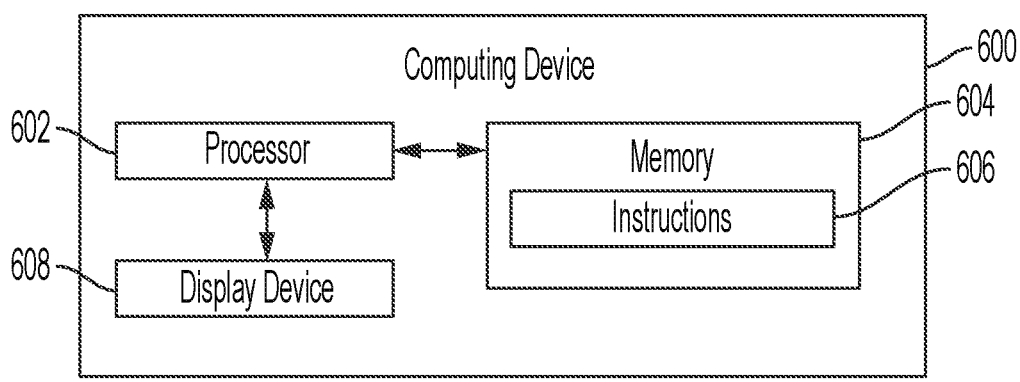
FIG. 6 shows a block diagram of a computing device usable for implementing some aspects of the present disclosure.

FIG. 6 shows a block diagram of a computing device 600 usable for implementing some aspects of the present disclosure. For example, the computing device 600 can be at least part of the client device 116 shown in FIG. 1.

The computing device 600 includes a processor 602 coupled to a memory 604 via a bus. The processor 602 can include one processing device or multiple processing devices. Non-limiting examples of the processor 602 include a Field-Programmable Gate Array (FPGA), an application-specific integrated circuit (ASIC), a microprocessor, or any combination of these. The processor 602 can execute instructions 606 stored in the memory 604 to perform operations. Examples of such operations can include any of the operations described above with respect to the client device 116. In some examples, the instructions 606 can include processor-specific instructions generated by a compiler or an interpreter from code written in any suitable computer-programming language, such as C, C++, C #, Python, or Java. In some examples, the instructions 606 may correspond to the log analysis tool 136 of FIG. 1.

The memory 604 can include one memory device or multiple memory devices. The memory 604 can be volatile or non-volatile (it can retain stored information when powered off). Non-limiting examples of the memory 604 include electrically erasable and programmable read-only memory (EEPROM), flash memory, or any other type of non-volatile memory. At least some of the memory device can include a non-transitory computer-readable medium from which the processor 602 can read instructions 606. A computer-readable medium can include electronic, optical, magnetic, or other storage devices capable of providing the processor 602 with computer-readable instructions or other program code. Non-limiting examples of a computer-readable medium include magnetic disks, memory chips, ROM, random-access memory (RAM), an ASIC, a configured processor, optical storage, or any other medium from which a computer processor can read the instructions 606.

The computing device 600 may also include other input and output (I/O) components. The input components can include a mouse, a keyboard, a trackball, a touch pad, a touch-screen display, or any combination of these. The input components are not shown here for simplicity. The output components can include a visual display (e.g., display device 608), an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

It will be appreciated that all of the figures are intended to be illustrative and non-limiting. Other examples may involve more components, fewer components, different components, or a different arrangement of the components than is shown in the figures. For instance, the system 100 can include any number and combination of development environments, applications, display devices, client devices, etc. The graphical user interface shown in FIGS. 2-4 may include more, fewer, different, or a different arrangement of the graphical elements, such as graphical options and graphical frames, than is shown.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A computer-implement method, comprising:
generating a network connection with a computing environment that includes a plurality of development environments executing a plurality of applications;
generating a graphical user interface for display on a display device, the graphical user interface including:
a first graphical option for allowing a user to select a particular development environment from among the plurality of development environments;
a second graphical option for allowing the user to select a particular application from among the plurality of applications;
a graphical submit element that is selectable by the user for retrieving log data associated with execution of the particular application in the particular development environment;
a first graphical frame; and
a second graphical frame that is distinct from the first graphical frame, wherein the graphical user interface is configured to allow the user to toggle between displaying the first graphical frame and the second graphical frame;
detecting a selection of the graphical submit element by the user;
in response to detecting the selection of the graphical submit element:
obtaining the log data from the computing environment via the network connection by:
determining that the plurality of applications are divided into a plurality of application groups in the computing environment, wherein each application group of the plurality of application groups includes a respective set of applications;
searching through each application group of the plurality of application groups to identify a particular application group that corresponds to the particular application selected by the user; and
transmitting a query to the computing environment for retrieving the log data associated with the particular application selected by the user, the query specifying the particular application group containing the particular application;
updating the first graphical frame to display the log data in its raw format as received from the computing environment; and
updating the second graphical frame to display a modified version of the log data, wherein the modified version of the log data includes at least a subset of the log data in a raw format of the log data with one or more portions highlighted to flag one or more operational errors associated with the particular application in the particular development environment, the one or more operational errors being identified by analyzing the log data.

2. The method of claim 1, further comprising executing a trained machine-learning model to identify the one or more operational errors based on the log data.

3. The method of claim 1, further comprising analyzing the log data using a predefined set of rules to identify the one or more operational errors.

4. The method of claim 1, further comprising establishing the network connection with the computing environment by performing a single-sign on process configured to authenticate with the computing environment.

5. The method of claim 1, further comprising generating the modified version of the log data by color coding a plurality of data entries in the log data, each respective data entry of the plurality of data entries being color coded based on a respective format of the data entry, such that different data formats are color coded using different colors from one another.

6. The method of claim 5, further comprising:
identifying JavaScript Object Notation (JSON) content in the log data;
configuring the modified version of the log data to display the JSON content in a first color;
identifying Extensive Markup Language (XML) content in the log data;
configuring the modified version of the log data to display the XML content in a second color;
identifying uniform resource locator (URLs) in the log data;
configuring the modified version of the log data to display the URLs in a third color;
identifying the one or more operational errors by analyzing the log data; and
configuring the modified version of the log data to display the one or more operational errors in a fourth color.

7. The method of claim 1, further comprising:
providing the user with a graphical option to automatically resolve an operational error of the one or more operational errors; and
in response to detecting a user selection of the graphical option:
automatically determining a strategy for resolving the operational error; and
automatically executing the strategy to resolve the operational error.

8. The method of claim 1, wherein a data entry in the log data includes particular content in a raw format of the particular content, and wherein the modified version of the log data includes the particular content as reformatted to have different tabbing than in the raw format.

9. A non-transitory computer-readable medium comprising program code that is executable by a processor for causing the processor to:
generate a network connection with a computing environment that includes a plurality of development environments executing a plurality of applications;
generate a graphical user interface for display on a display device, the graphical user interface including:
a first graphical option for allowing a user to select a particular development environment from among the plurality of development environments;
a second graphical option for allowing the user to select a particular application from among the plurality of applications;
a graphical submit element that is selectable by the user for retrieving log data associated with execution of the particular application in the particular development environment;
a first graphical frame; and
a second graphical frame that is distinct from the first graphical frame, wherein the graphical user interface is configured to allow the user to toggle between displaying the first graphical frame and the second graphical frame;

detect a selection of the graphical submit element by the user;

in response to detecting the selection of the graphical submit element:

obtain the log data from the computing environment via the network connection by:

determining that the plurality of applications are divided into a plurality of application groups in the computing environment, wherein each application group of the plurality of application groups includes a respective set of applications;

searching through each application group of the plurality of application groups to identify a particular application group that corresponds to the particular application selected by the user; and transmitting a query to the computing environment for retrieving the log data associated with the particular application selected by the user, the query specifying the particular application group containing the particular application;

update the first graphical frame to display the log data in its raw format as received from the computing environment; and update the second graphical frame to display a modified version of the log data, wherein the modified version of the log data includes at least a subset of the log data in a raw format of the log data with one or more portions highlighted to flag one or more operational errors associated with the particular application in the particular development environment, the one or more operational errors being identified by analyzing the log data.

10. The non-transitory computer-readable medium of claim 9, further comprising program code that is executable by the processor for causing the processor to:

analyze the log data using a trained machine-learning model to identify the one or more operational errors.

11. The non-transitory computer-readable medium of claim 9, further comprising program code that is executable by the processor for causing the processor to:

analyze the log data using a predefined set of rules to identify the one or more operational errors.

12. The non-transitory computer-readable medium of claim 9, further comprising program code that is executable by the processor for causing the processor to establish the network connection with the computing environment by performing a single-sign on process configured to authenticate with the computing environment.

13. The non-transitory computer-readable medium of claim 9, further comprising program code that is executable by the processor for causing the processor to:

generate the modified version of the log data by color coding a plurality of data entries in the log data, each respective data entry of the plurality of data entries being color coded based on a respective format of the data entry, such that different data formats are color coded using different colors from one another.

14. The non-transitory computer-readable medium of claim 13, further comprising program code that is executable by the processor for causing the processor to:

identify JavaScript Object Notation (JSON) content in the log data;

configure the modified version of the log data to display the JSON content in a first color;

identify Extensive Markup Language (XML) content in the log data;

configure the modified version of the log data to display the XML content in a second color;

identify a uniform resource locator (URL) in the log data;

configure the modified version of the log data to display the URL in a third color;

identify the one or more operational errors by analyzing the log data; and configure the modified version of the log data to display the one or more operational errors in a fourth color.

15. The non-transitory computer-readable medium of claim 9, further comprising program code that is executable by the processor for causing the processor to:

provide the user with a graphical option to automatically resolve an operational error of the one or more operational errors; and in response to detecting a user selection of the graphical option:

automatically determine a strategy for resolving the operational error; and automatically execute the strategy to resolve the operational error.

16. The non-transitory computer-readable medium of claim 9, wherein a data entry in the log data includes particular content in a raw format of the particular content, and wherein the modified version of the log data includes the particular content as reformatted to have different tabbing than in the raw format.

17. A system comprising:

one or more processors; and one or more memories including instructions that are executable by the one or more processors for causing the one or more processors to:

generate a network connection with a computing environment that includes a plurality of development environments executing a plurality of applications;

generate a graphical user interface for display on a display device, the graphical user interface including:

a first graphical option for allowing a user to select a particular development environment from among the plurality of development environments;

a second graphical option for allowing the user to select a particular application from among the plurality of applications;

a graphical submit element that is selectable by the user for retrieving log data associated with execution of the particular application in the particular development environment;

a first graphical frame; and a second graphical frame that is distinct from the first graphical frame, wherein the graphical user interface is configured to allow the user to toggle between displaying the first graphical frame and the second graphical frame;

detect a selection of the graphical submit element by the user;

in response to detecting the selection of the graphical submit element:

obtain the log data from the computing environment via the network connection by:

determining that the plurality of applications are divided into a plurality of application groups in the computing environment, wherein each application group of the plurality of application groups includes a respective set of applications;

searching through each application group of the plurality of application groups to identify a particular application group that corresponds to the particular application selected by the user; and transmitting a query to the computing environment for retrieving the log data associated with the particular application selected by the user, the query specifying the particular application group containing the particular application; and update the first graphical frame to display the log data in its raw format as received from the computing environment; and update the second graphical frame to display a modified version of the log data, wherein the modified version of the log data includes at least a subset of the log data in a raw format of the log data with one or more portions highlighted to flag one or more operational errors associated with the particular application in the particular development environment, the one or more operational errors being identified by analyzing the log data.

18. The system of claim 17, wherein the one or more memories further include instructions that are executable by the one or more processors for causing the one or more processors to:
analyze the log data using a trained machine-learning model or a predefined set of rules to identify the one or more operational errors.

19. The system of claim 17, wherein the one or more memories further include instructions that are executable by the one or more processors for causing the one or more processors to:
generate the modified version of the log data by color coding a plurality of data entries in the log data, each respective data entry of the plurality of data entries being color coded based on a respective format of the data entry, such that different data formats are color coded using different colors from one another.

20. The system of claim 17, wherein a data entry in the log data includes particular content in a raw format of the particular content, and wherein the modified version of the log data includes the particular content as reformatted to have different tabbing than in the raw format.

* * * * *